United States Patent
Berghoff (10) Patent No.: US 10,068,311 B2
(45) Date of Patent: Sep. 4, 2018

(54) VARYING EFFECTIVE RESOLUTION BY SCREEN LOCATION BY CHANGING ACTIVE COLOR SAMPLE COUNT WITHIN MULTIPLE RENDER TARGETS

(71) Applicants: SONY INTERACTIVE ENTERTAINMENT EUROPE LIMITED, London (GB); SONY INTERACTIVE ENTERTAINMENT LLC, San Mateo, CA (US)

(72) Inventor: Tobias Berghoff, Cambridge (GB)

(73) Assignees: Sony Interacive Entertainment LLC, San Mateo, CA (US); Sony Interactive Entertainment Europe Limited, London (GB)

( * ) Notice: Subject to any disclaimer, the term of this patent is extended or adjusted under 35 U.S.C. 154(b) by 155 days.

(21) Appl. No.: 14/246,061

(22) Filed: Apr. 5, 2014

(65) Prior Publication Data
US 2015/0287165 A1    Oct. 8, 2015

(51) Int. Cl.
*G06T 15/00* (2011.01)
*G06T 15/80* (2011.01)
(Continued)

(52) U.S. Cl.
CPC .............. *G06T 3/40* (2013.01); *G02B 27/017* (2013.01); *G02B 27/0189* (2013.01);
(Continued)

(58) Field of Classification Search
CPC ... G02B 27/0172; G06T 15/005; G06T 15/04; G06T 15/80; G06T 17/10; G06T 17/20; G06T 1/60; G06T 2210/36; G06T 3/40
See application file for complete search history.

(56) References Cited

U.S. PATENT DOCUMENTS

| 4,513,317 A | 4/1985 | Ruoff |
| 5,130,794 A * | 7/1992 | Ritchey ................... F41G 7/30 348/383 |

(Continued)

FOREIGN PATENT DOCUMENTS

| JP | 2000155850 A | 6/2000 |
| JP | 2004265413 A | 9/2004 |

(Continued)

OTHER PUBLICATIONS

John D. Owens, Mike Houston, David Luebke, Simon Green, John E. Stone, and James C. Phillips, "GPU Computing", Proceeding of IEEE, May 2008, p. 879-899.*

(Continued)

*Primary Examiner* — Sing-Wai Wu
(74) *Attorney, Agent, or Firm* — JDI Patent; Joshua D. Isenberg; Robert Pullman (57) ABSTRACT

A graphics processing unit (GPU) is configured to receive metadata specifying an active sample configuration for a particular region of a display device among a plurality of regions of the display device and receive pixel data for one or more pixels in the particular region. The pixel data specifies the same number of color samples for each pixel. For each pixel in the particular region, the GPU invokes a pixel shader only for color samples specified to be active samples by the configuration.

33 Claims, 7 Drawing Sheets

(51) Int. Cl.
*G06T 17/10* (2006.01)
*G06T 19/20* (2011.01)
*G06T 3/40* (2006.01)
*G02B 27/01* (2006.01)

(52) U.S. Cl.
CPC .......... *G06T 15/005* (2013.01); *G06T 15/80* (2013.01); *G06T 17/10* (2013.01); *G06T 19/20* (2013.01); *G02B 2027/014* (2013.01); *G06T 2210/36* (2013.01)

(56) References Cited

U.S. PATENT DOCUMENTS

| | | | |
|---|---|---|---|
| 5,224,208 | A | 6/1993 | Miller et al. |
| 5,422,653 | A * | 6/1995 | Maguire, Jr. ...... G02B 27/2228 345/9 |
| 5,602,391 | A | 2/1997 | Pines et al. |
| 5,777,913 | A * | 7/1998 | Rasmusson ........ H03H 21/0012 708/322 |
| H001812 | H * | 11/1999 | Arcuri ................. G06T 11/00 345/428 |
| 6,313,838 | B1 | 11/2001 | Deering |
| 6,417,861 | B1 | 7/2002 | Deering et al. |
| 6,469,700 | B1 | 10/2002 | Munshi et al. |
| 6,476,819 | B1 | 11/2002 | Ozawa |
| 6,804,066 | B1 | 10/2004 | Ha et al. |
| 6,906,723 | B2 | 6/2005 | Ault |
| 6,967,663 | B1 | 11/2005 | Bastos et al. |
| 7,046,245 | B2 | 5/2006 | Cerny et al. |
| 7,081,893 | B2 | 7/2006 | Cerny |
| 7,161,603 | B2 | 1/2007 | Saito et al. |
| 7,336,277 | B1 | 2/2008 | Clark et al. |
| 7,339,594 | B1 | 3/2008 | Newhall et al. |
| 7,355,604 | B2 | 4/2008 | Bando et al. |
| 7,426,724 | B2 | 9/2008 | Kilgard et al. |
| 7,511,717 | B1 | 3/2009 | Bastos et al. |
| 7,786,993 | B2 | 8/2010 | Cerny et al. |
| 7,876,332 | B1 | 1/2011 | Donham et al. |
| 7,907,792 | B2 | 3/2011 | Harville |
| 7,916,155 | B1 | 3/2011 | Moreton |
| 8,031,192 | B2 | 10/2011 | Cerny |
| 8,044,956 | B1 | 10/2011 | Kilgard |
| 8,090,383 | B1 | 1/2012 | Emigh et al. |
| 8,144,156 | B1 | 3/2012 | Baldwin |
| 8,149,242 | B2 | 4/2012 | Langyel et al. |
| 8,174,527 | B2 | 5/2012 | Cerny et al. |
| 8,207,975 | B1 | 6/2012 | Molnar et al. |
| 8,228,328 | B1 | 7/2012 | French et al. |
| 8,233,004 | B1 | 7/2012 | Molnar et al. |
| 8,300,059 | B2 | 10/2012 | Isidoro et al. |
| 8,581,929 | B1 | 11/2013 | Maguire |
| 8,669,999 | B2 | 3/2014 | Donovan et al. |
| 9,495,790 | B2 | 11/2016 | Cerny |
| 2002/0057279 | A1 | 5/2002 | Jouppi |
| 2003/0086603 | A1 | 5/2003 | Davidson et al. |
| 2003/0112238 | A1 | 6/2003 | Cerny et al. |
| 2003/0112240 | A1 | 6/2003 | Cerny |
| 2003/0122833 | A1 | 7/2003 | Doyle |
| 2003/0234784 | A1 | 12/2003 | Grzeszczuk et al. |
| 2004/0036692 | A1 | 2/2004 | Alcorn et al. |
| 2004/0169663 | A1 | 9/2004 | Bernier |
| 2004/0227703 | A1 | 11/2004 | Lamvik et al. |
| 2005/0017983 | A1 | 1/2005 | Liao et al. |
| 2005/0225670 | A1 * | 10/2005 | Wexler .................. G06T 1/20 348/441 |
| 2006/0001674 | A1 | 1/2006 | Cerny et al. |
| 2006/0077209 | A1 | 4/2006 | Bastos et al. |
| 2006/0256112 | A1 | 11/2006 | Heirich et al. |
| 2006/0277520 | A1 | 12/2006 | Gennari |
| 2007/0002049 | A1 | 1/2007 | Cerny |
| 2007/0018988 | A1 | 1/2007 | Guthe |
| 2007/0165035 | A1 | 7/2007 | Duluk et al. |
| 2007/0183649 | A1 | 8/2007 | Kiefer et al. |
| 2008/0062164 | A1 | 3/2008 | Bassi et al. |
| 2008/0106489 | A1 | 5/2008 | Brown et al. |
| 2008/0113792 | A1 | 5/2008 | Yamada et al. |
| 2008/0129748 | A1 | 6/2008 | Bakalash et al. |
| 2009/0002380 | A1 | 1/2009 | Langyel et al. |
| 2009/0141033 | A1 | 6/2009 | Street |
| 2010/0002000 | A1 | 1/2010 | Everitt et al. |
| 2010/0007662 | A1 | 1/2010 | Cox et al. |
| 2010/0104162 | A1 | 4/2010 | Falk et al. |
| 2010/0110102 | A1 | 5/2010 | Nystad et al. |
| 2010/0156919 | A1 | 6/2010 | Bala et al. |
| 2010/0214294 | A1 | 8/2010 | Li et al. |
| 2010/0283783 | A1 | 11/2010 | Cerny et al. |
| 2011/0090242 | A1 | 4/2011 | Frederiksen |
| 2011/0090250 | A1 | 4/2011 | Molnar et al. |
| 2011/0134136 | A1 | 6/2011 | Seiler |
| 2011/0188744 | A1 | 8/2011 | Sun |
| 2011/0216069 | A1 | 9/2011 | Keall et al. |
| 2012/0014576 | A1 * | 1/2012 | Olson .................. G06F 19/321 382/128 |
| 2012/0069021 | A1 | 3/2012 | Son et al. |
| 2012/0092366 | A1 | 4/2012 | Smithers et al. |
| 2012/0206452 | A1 | 8/2012 | Geisner et al. |
| 2012/0293486 | A1 | 11/2012 | Adachi |
| 2012/0293519 | A1 | 11/2012 | Ribble et al. |
| 2013/0021358 | A1 | 1/2013 | Nordlund et al. |
| 2013/0063440 | A1 | 3/2013 | Son et al. |
| 2013/0093766 | A1 | 4/2013 | Hutchins et al. |
| 2013/0114680 | A1 | 5/2013 | Leontaris et al. |
| 2013/0120380 | A1 | 5/2013 | Kallio et al. |
| 2013/0141445 | A1 | 6/2013 | Engh-Halstvedt et al. |
| 2013/0265309 | A1 | 10/2013 | Goel et al. |
| 2013/0300740 | A1 | 11/2013 | Snyder et al. |
| 2013/0342547 | A1 | 12/2013 | Lum et al. |
| 2014/0049549 | A1 | 2/2014 | Lukyanov et al. |
| 2014/0063016 | A1 | 3/2014 | Howson et al. |
| 2014/0362081 | A1 | 12/2014 | Cerny et al. |
| 2014/0362100 | A1 | 12/2014 | Cerny et al. |
| 2014/0362101 | A1 | 12/2014 | Cerny et al. |
| 2014/0362102 | A1 | 12/2014 | Cerny et al. |
| 2015/0089367 | A1 * | 3/2015 | Dodge .................. G06F 9/4445 715/716 |
| 2015/0287158 | A1 | 10/2015 | Cerny et al. |
| 2015/0287166 | A1 | 10/2015 | Cerny |
| 2015/0287167 | A1 | 10/2015 | Cerny |
| 2015/0287230 | A1 | 10/2015 | Cerny |
| 2015/0287232 | A1 | 10/2015 | Cerny |
| 2016/0246323 | A1 | 8/2016 | Cerny et al. |
| 2017/0031732 | A1 | 2/2017 | Cerny et al. |
| 2017/0031834 | A1 | 2/2017 | Cerny et al. |
| 2017/0061671 | A1 | 3/2017 | Cerny |
| 2017/0123961 | A1 | 5/2017 | Cerny et al. |

FOREIGN PATENT DOCUMENTS

| | | |
|---|---|---|
| JP | 2006293627 A | 10/2006 |
| JP | 2008233765 A | 10/2008 |
| JP | 2009116550 A | 5/2009 |
| JP | 2013137756 A | 7/2013 |
| TW | I250785 B | 3/2006 |
| TW | 200919376 A | 5/2009 |
| TW | 201001329 A | 1/2010 |
| TW | 201143466 A | 12/2011 |
| WO | 2010111258 A1 | 9/2010 |
| WO | 2013076994 A1 | 5/2013 |

OTHER PUBLICATIONS

Matthaus G. Chajdas, Morgan McGuire, David Luebke; "Subpixel Reconstruction Antialiasing for Deferred Shading" in i3D, Feb. 2011.
U.S. Appl. No. 14/246,068, to Mark Evan Cerny, filed Apr. 5, 2014.
U.S. Appl. No. 14/246,062, to Mark Evan Cerny, filed Apr. 5, 2014.
U.S. Appl. No. 14/246,063, to Mark Evan Cerny, filed Apr. 5, 2014.
U.S. Appl. No. 14/246,064, to Tobias Berghoff, filed Apr. 5, 2014.
U.S. Appl. No. 14/246,067, to Tobias Berghoff, filed Apr. 5, 2014.
U.S. Appl. No. 61/975,774, to Mark Evan Cerny, filed Apr. 5, 2014.
U.S. Appl. No. 14/246,066, to Mark Evan Cerny, filed Apr. 5, 2014.
International Search Report and Written Opinion for International (56) References Cited

OTHER PUBLICATIONS

Application No. PCT/US2015/024303, dated Jul. 1, 2015.
International Search Report and Written Opinion for International Application No. PCT/US2015/21951, dated Jul. 1, 2015.
International Search Report and Written Opinion for International Application No. PCT/US2015/21956, dated Jul. 1, 2015.
International Search Report and Written Opinion for International Application No. PCT/US2015/21971, dated Jul. 1, 2015.
International Search Report and Written Opinion for International Application No. PCT/US2015/21978, dated Jul. 1, 2015.
International Search Report and Written Opinion for International Application No. PCT/US2015/21984, dated Jul. 1, 2015.
International Search Report and Written Opinion for International Application No. PCT/US2015/21987, dated Jul. 1, 2015.
International Search Report and Written Opinion for International Application No. PCT/US201521982, dated Jul. 1, 2015.
U.S. Appl. No. 14/678,445, to Mark Evan Cerny, filed Apr. 3, 2015.
Non-Final Office Action for U.S. Appl. No. 14/246,062, dated Jan. 14, 2016.
Non-Final Office Action for U.S. Appl. No. 14/246,063, dated Jan. 4, 2016.
Non-Final Office Action for U.S. Appl. No. 14/246,064, dated Feb. 1, 2015.
Non-Final Office Action for U.S. Appl. No. 14/246,066, dated Feb. 5, 2016.
Non-Final Office Action for U.S. Appl. No. 14/246,067, dated Jan. 22, 2016.
Non-Final Office Action for U.S. Appl. No. 14/246,068, dated Jan. 14, 2016.
Taiwanese Office Action for TW Application No. 104108773, dated Dec. 22, 2015.
Final Office Action for U.S. Appl. No. 14/246,062, dated Jul. 15, 2016.
Final Office Action for U.S. Appl. No. 14/246,063, dated Jun. 21, 2016.
Final Office Action for U.S. Appl. No. 14/246,064, dated Jul. 11, 2016.
Final Office Action for U.S. Appl. No. 14/246,066, dated Jul. 20, 2016.
Final Office Action for U.S. Appl. No. 14/246,067, dated Jun. 17, 2016.
Notice of Allowance for U.S. Appl. No. 14/246,068, dated Jul. 15, 2016.
Taiwan Office Action for TW Application No. 104108777, dated Jun. 27, 2016.
Non-Final Office Action for U.S. Appl. No. 14/246,063, dated Nov. 23, 2016.
Non-Final Office Action for U.S. Appl. No. 14/246,064, dated Dec. 8, 2016.
Non-Final Office Action for U.S. Appl. No. 14/246,066, dated Dec. 30, 2016.
Non-Final Office Action for U.S. Appl. No. 14/246,067, dated Oct. 27, 2016.
Non-Final Office Action for U.S. Appl. No. 14/678,445, dated Dec. 30, 2016.
Notice of Allowance for U.S. Appl. No. 14/246,062, dated Jan. 4, 2017.
Taiwanese Office Action for TW Application No. 104108774, dated Sep. 12, 2016.
Co-Pending U.S. Appl. No. 14/246,061, to Tobias Berghoff, filed Apr. 5, 2014.
Co-Pending U.S. Appl. No. 14/246,062, to Mark Evan Cerny, filed Apr. 5, 2014.
Co-Pending U.S. Appl. No. 14/246,063, to Mark Evan Cerny, filed Apr. 5, 2014.
Co-Pending U.S. Appl. No. 14/246,064, to Tobias Berghoff, filed Apr. 5, 2014.
Co-Pending U.S. Appl. No. 14/246,066, to Mark Evan Cerny, filed Apr. 5, 2014.
Co-Pending U.S. Appl. No. 14/246,067, to Tobias Berghoff, filed Apr. 5, 2014.
Co-Pending U.S. Appl. No. 14/246,068, to Mark Evan Cerny, filed Apr. 5, 2014.
Co-Pending U.S. Appl. No. 14/246,066, to Mark Cerny, filed Apr. 5, 2014.
Non-Final Office Action for U.S. Appl. No. 15/587,825, dated Jun. 30, 2017.
International Search Report and Written Opinion for International Application No. PCT/US2015021982, dated Nov. 30, 2017.
Jacob Munkberg et al: "Hierarchical stochastic motion blur rasterization",High Performance Graphics, Association for Computing Machinery, Inc., Aug. 5, 2011 (Aug. 5, 2011), pp. 107-118.
Non-Final Office Action for U.S. Appl. No. 15/717,041, dated Dec. 14, 2017.
Extended European search report dated Aug. 29, 2017 for European Patent Application No. 15773477.3.
Notice of Allowance dated Aug. 4, 2017 for U.S. Appl. No. 12/246,066.
Notification of Reason(s) for Refusal dated Sep. 12, 2017 for Japanese Patent application No. 2016-559961.
Office Action dated Aug. 1, 2017 for Korean Patent Application No. 0-2016-7027635.
Marries Van De Hoef et al: "Comparison of mutiple rendering techniques", Jun. 4, 2010 (Jun. 9, 2010).
Scott Kircher et al: "Inferred lighting: fast dynamic lighting and shadows for opaque and translucent objects", Sandbox 2009 : Proceedings ; 4th ACM SIGGRAPH Symposium on Video Games ; New Orleans , Louisiana , Aug. 4-6, 2009 , ACM, New York.
Steve Marschner et al: "Geometry-Aware Framebuffer, Level of Detail", Eurographics Symposium on Rendering 2008, Jan. 1, 2008 (Jan. 1, 2008).
Office Action dated Sep. 5, 2017 for Japanese Patent Application No. 2016-560642.
Extended European search report dated Sep. 22, 2017 for European Patent Application No. 15772568.0.
Extended European Search Report dated Oct. 2, 2017 for European patent application EP15773048.
Extended European Search Report dated Sep. 22, 2017 for EP Application No. 15772990.
Kayvon Fatahalian et al: "Reducing shading on GPUs using quad-fragment merging", ACM Transactions on Graphics US, vol. 29, No. 4, Jul. 26, 2010 pp. 1-8, XP058157954, ISSN: 0730-0301.
Marries Van De Hoef et al: "Comparison of multiple rendering techniques", Jun. 4, 2010 (Jun. 9, 2010).
Non-Final/Final Office Action for U.S. Appl. No. 14/246,061, dated Aug. 24, 2017.
Notice of Allowance for U.S. Appl. No. 14/246,066, dated Aug. 4, 2017.
Office Action dated Aug. 29, 2017 for TW Application No. 105138883.
Office Action dated Oct. 3, 2017 for JP Application No. 2016-560398.
Office Action dated Oct. 31, 2017 for Japan Patent Application 2016-560646.
Shirman et al, "A new look at mipmap level estimation techniques", Computers and Graphics , Elsevier, GB , vol. 23 , No. 2, Apr. 1, 1999 (Apr. 1999) , pp. 223-231 , XP004165786 , ISSN: 0097-8493.
Office Action dated May 28, 2018 for Korean Patent Application No. 2016-7027633.
Notice of Allowance dated Jul. 17, 2018 for U.S. Appl. No. 15/717,041.
Notice of Allowance dated May 31, 2018 for U.S. Appl. No. 15/587,825.

\* cited by examiner

90 degree FOV

FIG. 1A

114 degree FOV

FIG. 2A 114 degree FOV

FIG. 2B 90 degree FOV

| 1 | 1 | 2 | 2 | 1 | 1 |
|---|---|---|---|---|---|
| 1 | 2 | 3 | 3 | 2 | 1 |
| 2 | 3 | 4 | 4 | 3 | 2 |
| 2 | 3 | 4 | 4 | 3 | 2 |
| 1 | 2 | 3 | 3 | 2 | 1 |
| 1 | 1 | 2 | 2 | 1 | 1 |

| 1 | 1 | 1 | 2 | 1 | 1 |
|---|---|---|---|---|---|
| 1 | 2 | 2 | 3 | 2 | 1 |
| 1 | 2 | 3 | 4 | 3 | 2 |
| 1 | 1 | 2 | 3 | 2 | 2 |
| 1 | 2 | 1 | 2 | 2 | 1 |
| 1 | 1 | 1 | 1 | 1 | 1 |

FIG. 4E

VARYING EFFECTIVE RESOLUTION BY SCREEN LOCATION BY CHANGING ACTIVE COLOR SAMPLE COUNT WITHIN MULTIPLE RENDER TARGETS

CROSS REFERENCE TO RELATED APPLICATIONS

This application is related to commonly-assigned, co-pending U.S. patent application Ser. No. 14/246,064, to Tobias Berghoff, entitled "METHOD FOR EFFICIENT CONSTRUCTION OF HIGH RESOLUTION DISPLAY BUFFERS", filed the same day as the present application, the entire contents of which are herein incorporated by reference.

This application is related to commonly-assigned, co-pending U.S. patent application Ser. No. 14/246,067, to Tobias Berghoff, entitled "GRAPHICS PROCESSING ENHANCEMENT BY TRACKING OBJECT AND/OR PRIMITIVE IDENTIFIERS", filed the same day as the present application, the entire contents of which are herein incorporated by reference.

This application is related to commonly-assigned, co-pending U.S. patent application Ser. No. 14/246,068, to Mark Evan Cerny, entitled "GRADIENT ADJUSTMENT FOR TEXTURE MAPPING TO NON-ORTHONORMAL GRID", filed the same day as the present application, the entire contents of which are herein incorporated by reference.

This application is related to commonly-assigned, co-pending U.S. patent application Ser. No. 14/246,063, to Mark Evan Cerny, entitled "VARYING EFFECTIVE RESOLUTION BY SCREEN LOCATION BY ALTERING RASTERIZATION PARAMETERS", filed the same day as the present application, the entire contents of which are herein incorporated by reference.

This application is related to commonly-assigned, co-pending U.S. patent application Ser. No. 14/246,066, to Mark Evan Cerny, entitled "VARYING EFFECTIVE RESOLUTION BY SCREEN LOCATION IN GRAPHICS PROCESSING BY APPROXIMATING PROJECTION OF VERTICES ONTO CURVED VIEWPORT", filed the same day as the present application, the entire contents of which are herein incorporated by reference.

This application is related to commonly-assigned, co-pending U.S. patent application Ser. No. 14/246,062, to Mark Evan Cerny, entitled "GRADIENT ADJUSTMENT FOR TEXTURE MAPPING FOR MULTIPLE RENDER TARGETS WITH RESOLUTION THAT VARIES BY SCREEN LOCATION", filed the same day as the present application, the entire contents of which are herein incorporated by reference.

FIELD OF THE DISCLOSURE

Aspects of the present disclosure are related to computer graphics. In particular, the present disclosure is related to varying resolution by screen location.

BACKGROUND

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, tablet computers, portable game devices, workstations, and game consoles. A GPU is typically designed to be efficient at manipulating computer graphics. GPUs often have a highly parallel processing architecture that makes the GPU more effective than a general-purpose CPU for algorithms where processing of large blocks of data is done in parallel.

The CPU may send the GPU instructions, commonly referred to as draw commands, that instruct the GPU to implement a particular graphics processing task, e.g. render a particular texture that has changed with respect to a previous frame in an image. These draw commands may be coordinated by the CPU with a graphics application programming interface (API) in order to issue graphics rendering commands that correspond to the state of the particular application's virtual environment.

In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data suitable for output display, and additional rendering tasks on the pixels (or fragments) before outputting the rendered image on a display.

Virtual objects of an image are often described in virtual space in terms of shapes known as primitives, which together make the shapes of the objects in the virtual scene. For example, objects in a three-dimensional virtual world to be rendered may be reduced to a series of distinct triangle primitives having vertices defined in terms of their coordinates in three-dimensional space, whereby these polygons make up the surfaces of the objects. Each polygon may have an associated index that can be used by the graphics processing system to distinguish a given polygon from other polygons. Likewise, each vertex may have an associated index that can be used to distinguish a given vertex from other vertices. A graphics pipeline may perform certain operations on these primitives to produce visuals for the virtual scene and transform this data into a two-dimensional format suitable for reproduction by the pixels of the display. The term graphics primitive information (or simply "primitive information"), as used herein, is used to refer to data representative of a graphics primitive. Such data includes, but is not limited to, vertex information (e.g., data representing vertex positions or vertex indices) and polygon information, e.g., polygon indices and information that associates particular vertices with particular polygons.

As part of the graphics pipeline, the GPU may perform rendering tasks by implementing programs commonly known as shaders. A typical graphics pipeline may include vertex shaders, which may manipulate certain properties of the primitives on a per-vertex basis, as well as pixel shaders (also known as "fragment shaders"), which operate downstream from the vertex shaders in the graphics pipeline and may manipulate certain values on a per-pixel basis before transmitting the pixel data to a display. The fragment shaders may manipulate values relevant to applying textures to primitives. The pipeline may also include other shaders at various stages in the pipeline, such as geometry shaders that use the output of the vertex shaders to generate a new set of primitives, as well as compute shaders (CS) which may be implemented by a GPU to perform certain other general computational tasks.

Graphical display devices having a wide field of view (FOV) have been developed. Such devices include head mounted display (HMD) devices. In an HMD device, a small display device is worn on a user's head. The display device has a display optic in front of one eye (monocular HMD) or each eye (binocular HMD). An HMD device typically includes sensors that can sense the orientation of the device and change the scene shown by the display optics as the user's head moves. Conventionally, most stages of rendering scenes for wide FOV displays are performed by planar rendering where all parts of the screen have the same number of pixels per unit area.

To provide a realistic experience it is desirable for the graphics presented by a wide FOV display device to be of high quality and efficiently rendered.

It is within this context that the present disclosure arises.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

INTRODUCTION

Figure 1A:
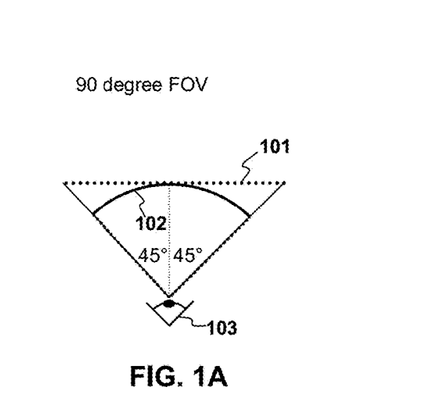
FIG. 1A and FIG. 1B are simplified diagrams illustrating certain parameters of wide field of view (FOV) displays.
Figure 1B:
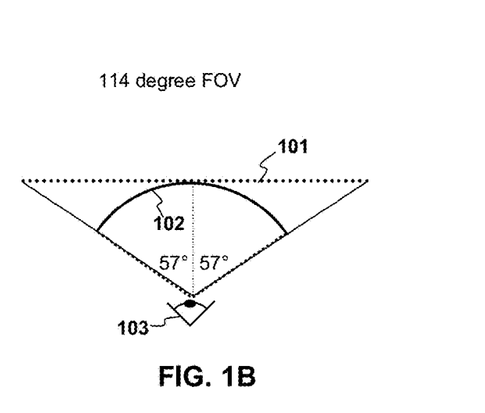
Figure 1C:
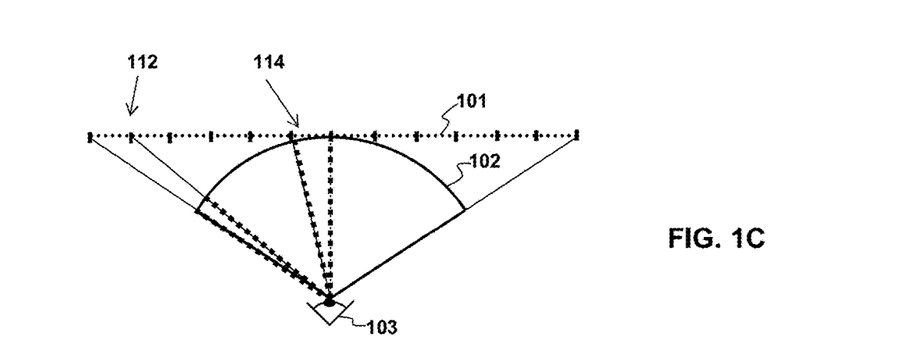
FIG. 1C illustrates different solid angles for different portions of a wide FOV display.

FIGS. 1A-1C illustrate a previously unappreciated problem with large FOV displays. FIG. 1A illustrates a 90 degree FOV display and FIG. 1B illustrates a 114 degree FOV display. In a conventional large FOV display, three dimensional geometry is rendered using a planar projection to the view plane. However, it turns out that rendering geometry onto a high FOV view plane is very inefficient. As may be seen in FIG. 1C, edge regions 112 and central regions 114 of view plane 101 are the same area but represent very different solid angles, as seen by a viewer 103. Consequently, pixels near the edge of the screen hold much less meaningful information than pixels near the center. When rendering the scene conventionally, these regions have the same number of pixels and the time spent rendering equal sized regions on the screen is the same.

Figure 2A:
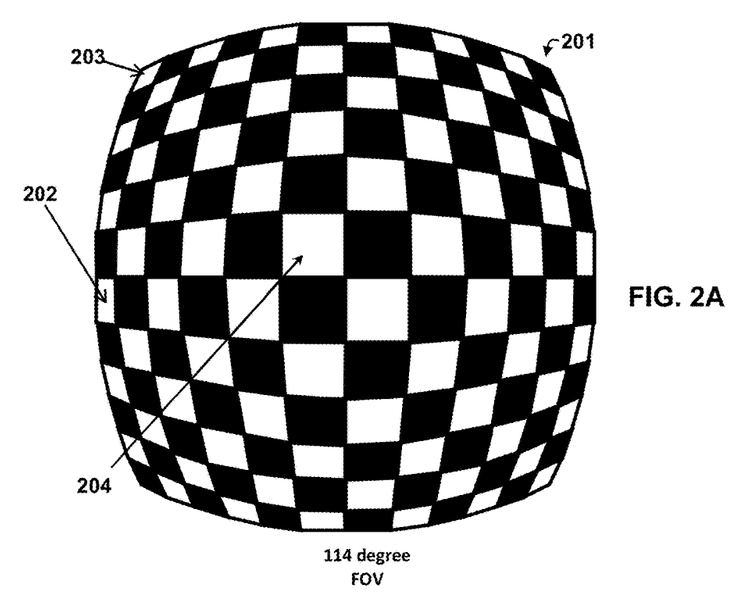
FIGS. 2A-2C illustrate examples of the relative importance of pixels in different regions of different wide FOV displays in accordance with aspects of the present disclosure.
Figure 2B:
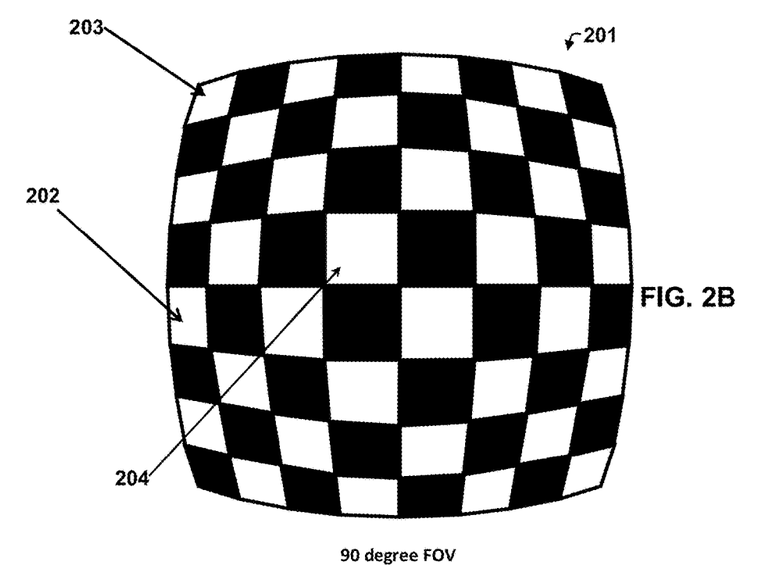
Figure 2C:
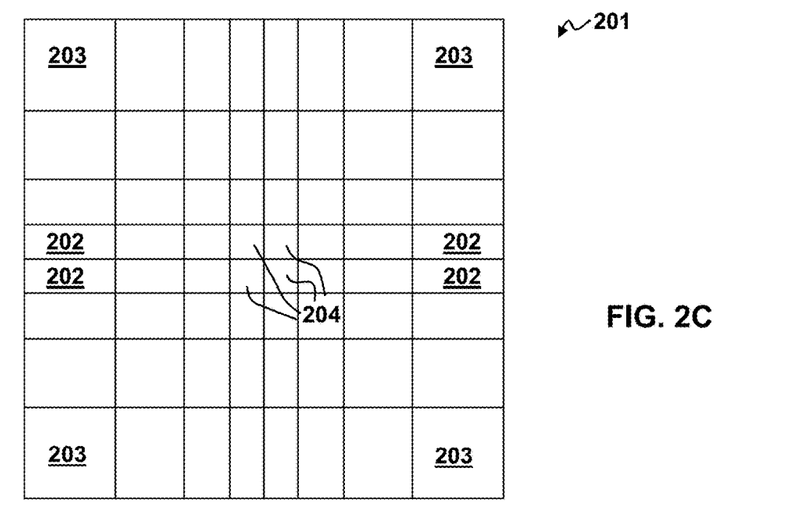

FIGS. 2A-2C illustrate the relative importance of different portions of a large FOV display in two dimensions for different sized fields of view. FIG. 2A expresses the variance in solid angle for each square of a planar checkerboard perpendicular to the direction of view, in the case that the checkerboard subtends an angle of 114 degrees. In other words, it expresses the inefficiency of conventional planar projective rendering to a 114 degree FOV display. FIG. 2B expresses the same information for a 90 degree FOV display. In such planar projective rendering, the projection compresses tiles 202 in the image 201 that are at the edges and tiles 203 at the corners into smaller solid angles compared to tiles 204 at the center. Because of this compression, and the fact that each tile in the image 201 has the same number of pixels in screen space, there is an inefficiency factor of roughly 4× for rendering the edge tiles 202 compared to the center tiles 204. By this it is meant that conventional rendering of the edge tiles 202 involves roughly 4 times as much processing per unit solid angle than for the center tiles 204. For the corner tiles 203, the inefficiency factor is roughly 8×. When averaged over the whole image 201, the inefficiency factor is roughly 2.5×.

The inefficiency is dependent on the size of the FOV. For example, for the 90 degree FOV display shown in FIG. 2B, the inefficiency factors are roughly 2× for rendering the edge tiles 202, roughly 3× for rendering the corner tiles 203, and roughly 1.7× overall for rendering the image 201.

Another way of looking at this situation is shown in FIG. 2C, in which the screen 102 has been divided into rectangles of approximately equal "importance" in terms of pixels per unit solid angle subtended. Each rectangle makes roughly the same contribution to the final image as seen through the display. One can see how the planar projection distorts the importance of edge rectangles 202 and corner rectangles 203. In fact, the corner rectangles 203 might make less of a contribution to the center rectangles due to the display optics, which may choose to make the visual density of pixels (as expressed as pixels per solid angle) higher towards the center of the display.

Figure 2D:
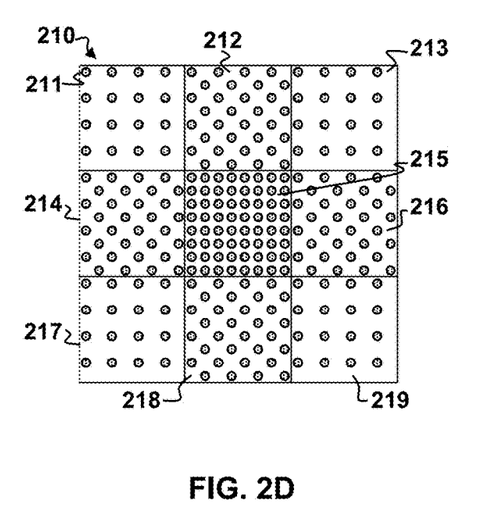
FIG. 2D illustrates an example of different pixel resolution for different regions of a screen of a FOV display in accordance with aspects of the present disclosure.

Based on the foregoing observations, it would be advantageous for an image 210 for a wide FOV display to have pixel densities that are smaller at edge regions 212, 214, 216, 218 than at center regions 215 and smaller at corner regions 211, 213, 217, and 219 than at the edge regions 212, 214, 216, 218 as shown in FIG. 2D. It would also be advantageous to render a conventional graphical image on the screen of a wide FOV display in a way that gets the same effect as varying the pixel densities across the screen without having to significantly modify the underlying graphical image data or data format or the processing of the data.

According to aspects of the present disclosure these advantages can be obtained in the graphics pipeline by varying the number of active color samples for which pixel shaders are invoked for different regions of the screen of a large FOV display device.

To implement this, part of the graphics pipeline uses metadata that specifies the number of active color samples per pixel in different regions of the screen. The metadata is associated with the screen, not the image. The image data is not changed, but in the graphics pipeline pixel shader execution is done only over the active color samples. For example, in the image data there may be four color samples per pixel. For a full resolution region of the screen, the metadata may specify the active count to be four, in which case, the pixel shader is invoked for all four color samples. In a ¾ resolution region, the active count may be three, in which case, the pixel shader is invoked for three of the four color samples (e.g., the first 3). In a ½ resolution region, the active count would be two and the pixel shader would be invoked for two of the color samples. In a ¼ resolution region, the active count would be one and the pixel shader would be invoked for only one of the four color samples.

System and Apparatus

Figure 3A:
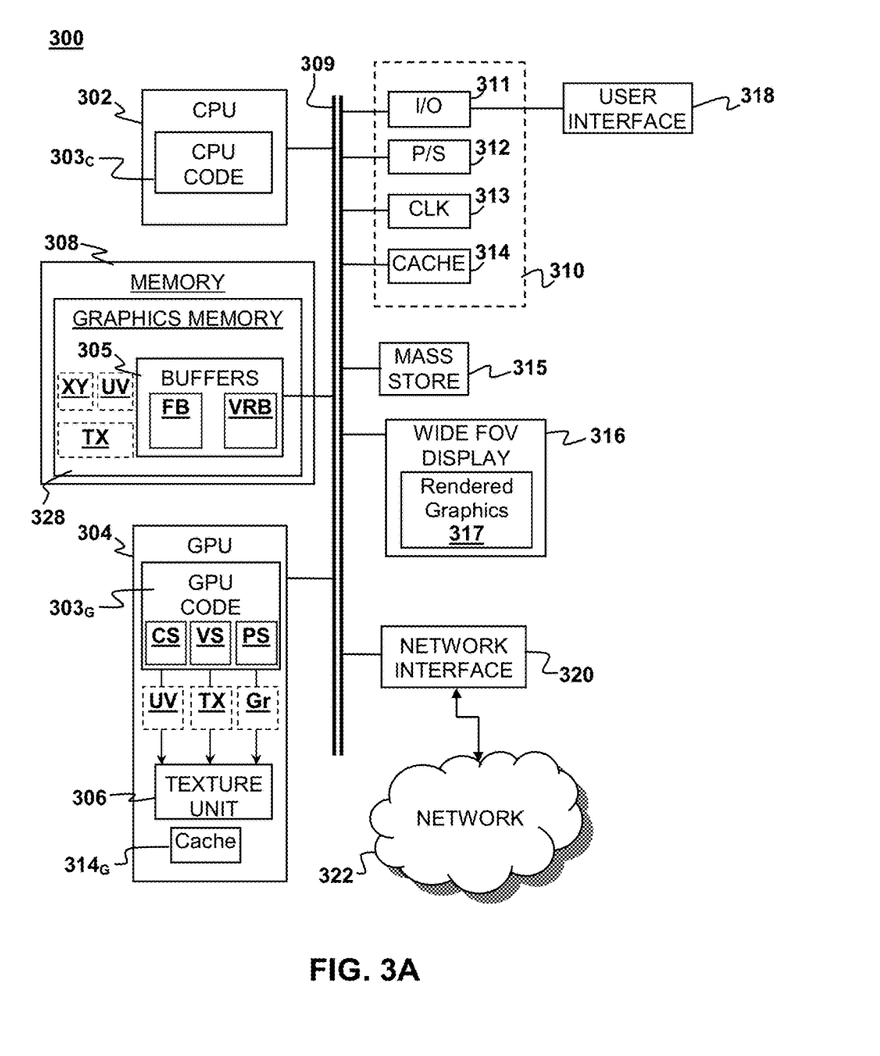
FIG. 3A is a block diagram of a graphics processing system in accordance with aspects of the present disclosure.

Aspects of the present disclosure include graphics processing systems that are configured to implement graphics processing with variable pixel sample resolution. By way of example, and not by way of limitation, FIG. 3A illustrates a block diagram of a computer system 300 that may be used to implement graphics processing according to aspects of the present disclosure. According to aspects of the present disclosure, the system 300 may be an embedded system, mobile phone, personal computer, tablet computer, portable game device, workstation, game console, and the like.

The system 300 generally may include a central processor unit (CPU) 302, a graphics processor unit (GPU) 304, and a memory 308 that is accessible to both the CPU and GPU. The CPU 302 and GPU 304 may each include one or more processor cores, e.g., a single core, two cores, four cores, eight cores, or more. The memory 308 may be in the form of an integrated circuit that provides addressable memory, e.g., RAM, DRAM, and the like. The memory 308 may include graphics memory 328 that may store graphics resources and temporarily store graphics buffers 305 of data for a graphics rendering pipeline. The graphics buffers 305 may include, e.g., vertex buffers for storing vertex parameter values, index buffers for holding vertex indices, depth buffers (e.g., Z-buffers) for storing depth values of graphics content, stencil buffers, frame buffers for storing completed frames to be sent to a display, and other buffers. In the example shown in FIG. 3A, the graphics memory 328 is shown as part of the main memory. In alternative implementations, the graphics memory could be a separate component, possibly integrated into the GPU 304.

By way of example, and not by way of limitation, the CPU 302 and GPU 304 may access the memory 308 using a data bus 309. In some cases, it may be useful for the system 300 to include two or more different buses. The memory 308 may contain data that can be accessed by the CPU 302 and GPU 304. The GPU 304 may include a plurality of compute units configured to perform graphics processing tasks in parallel. Each compute unit may include its own dedicated local memory store, such as a local data share.

The CPU may be configured to execute CPU code $303_C$, which may include an application that utilizes graphics, a compiler and a graphics API. The graphics API can be configured to issue draw commands to programs implemented by the GPU. The CPU code $303_C$ may also implement physics simulations and other functions. The GPU 304 may be configured to operate as discussed above. In particular, the GPU may execute GPU code $303_G$, which may implement shaders, such as compute shaders CS, vertex shaders VS, and pixel shaders PS, as discussed above. To facilitate passing of data between the compute shaders CS and the vertex shaders VS the system may include one or more buffers 305, which may include a frame buffer FB. The GPU code $303_G$ may also optionally implement other types of shaders (not shown), such as pixel shaders or geometry shaders. Each compute unit may include its own dedicated local memory store, such as a local data share. The GPU 304 may include a texture unit 306 configured to perform certain operations for applying textures to primitives as part of a graphics pipeline.

According to aspects of the present disclosure, the CPU code $303_c$ and GPU code $303_g$ and other elements of the system 300 are configured so that a rasterization stage of the graphics pipeline receives metadata MD specifying an active sample configuration for a particular region of the display device 316 among a plurality of regions of the display device. The rasterization stage receives pixel data for one or more pixels in the particular region. The pixel data specifies the same sample count (number of color samples for each pixel) over the entire surface. The active sample count is less than or equal to the color sample count and the color sample count is two or more. For each pixel in the particular region, the rasterization stage invokes a pixel shader PS only for active samples. The metadata MD specifies different active sample configurations for regions that are to have different pixel sample resolutions (number of pixel samples per unit area of the display). In this way pixel sample resolution can vary for different regions of the display device 316 and the graphics processing load can be reduced for low-resolution regions of the display simply by reducing the active sample count for these regions relative to high resolution regions.

In some implementations, the metadata MD includes a mask of active samples for each region. The GPU 304 performs a logical AND between the mask a samples covered by a primitive to determine the active samples for the primitive for which the pixel shader is to be invoked.

In an alternative implementation, the metadata MD specifies an active sample count for a particular region of the display device 316 among a plurality of regions of the display device. The active sample count is less than or equal to the color sample count and the color sample count is two or more. For each pixel in the particular region, the rasterization stage invokes a pixel shader PS only for a number of the color samples for the pixel equal to the active sample count, typically sequential color samples starting with the first in some consistently defined sample order.

In some implementations, the CPU code $303_c$, GPU code $303_g$, and texture unit 306 may be further configured to implement certain texture mapping operations to implement modifications to texture mapping operations in conjunction with screen location dependent variable pixel resolution. For example, a pixel shader PS and the texture unit 306 can be configured to generate one or more texture coordinates UV per pixel location XY for a primitive to provide a coordinate set for one or more texture mapping operations, calculate gradient values Gr from the texture coordinates UV (possibly including corrections to account for differing sample density over the screen) and determine a level of detail (LOD) for a texture to apply to the primitive.

By way of example, and not by way of limitation, certain components of the GPU, e.g., certain types of shaders or the texture unit 306, may be implemented as special purpose hardware, such as an application-specific integrated circuit (ASIC), Field Programmable Gate Array (FPGA), or a system on chip (SoC or SOC).

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:
- One or more processor cores (e.g., microcontroller, microprocessor or digital signal processor (DSP) cores.
- Memory blocks, e.g., read only memory (ROM), random access memory (RAM), electrically erasable programmable read-only memory (EEPROM) and flash memory.
- Timing sources, such as oscillators or phase-locked loops.
- Peripherals, such as counter-timers, real-time timers, or power-on reset generators.
- External interfaces, e.g., industry standards such as universal serial bus (USB), FireWire, Ethernet, universal asynchronous receiver/transmitter (USART), serial peripheral interface (SPI) bus.
- Analog interfaces including analog to digital converters (ADCs) and digital to analog converters (DACs).
- Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals and interfaces.

According to aspects of the present disclosure, some or all of the functions of the shaders or the texture unit 306 may alternatively be implemented by appropriately configured software instructions executed by a software programmable general purpose computer processor. Such instructions may be embodied in a computer-readable medium, e.g., memory 308 or storage device 315.

The system 300 may also include well-known support functions 310, which may communicate with other components of the system, e.g., via the bus 309. Such support functions may include, but are not limited to, input/output (I/O) elements 311, power supplies (P/S) 312, a clock (CLK) 313 and cache 314. In addition to the cache 314, the GPU 304 may include its own GPU cache $314_G$, and the GPU may be configured so that programs running on the GPU 304 can read-through or write-though the GPU cache $314_G$.

The system 300 may include the display device 316 to present rendered graphics 317 to a user. In alternative implementations, the display device 316 is a separate component that works in conjunction with the system 300. The display device 316 may be in the form of a flat panel display, head mounted display (HMD), cathode ray tube (CRT) screen, projector, or other device that can display visible text, numerals, graphical symbols or images. In particularly useful implementations, the display 316 is a large field of view (FOV) device having a curved screen. The display device 316 displays rendered graphic images 317 processed in accordance with various techniques described herein.

The system 300 may optionally include a mass storage device 315 such as a disk drive, CD-ROM drive, flash memory, tape drive, or the like to store programs and/or data. The system 300 may also optionally include a user interface unit 318 to facilitate interaction between the system 300 and a user. The user interface 318 may include a keyboard, mouse, joystick, light pen, game controller, or other device that may be used in conjunction with a graphical user interface (GUI). The system 300 may also include a network interface 320 to enable the device to communicate with other devices over a network 322. The network 322 may be, e.g., a local area network (LAN), a wide area network such as the internet, a personal area network, such as a Bluetooth network or other type of network. These components may be implemented in hardware, software, or firmware, or some combination of two or more of these.

Graphics Pipeline

Figure 3B:
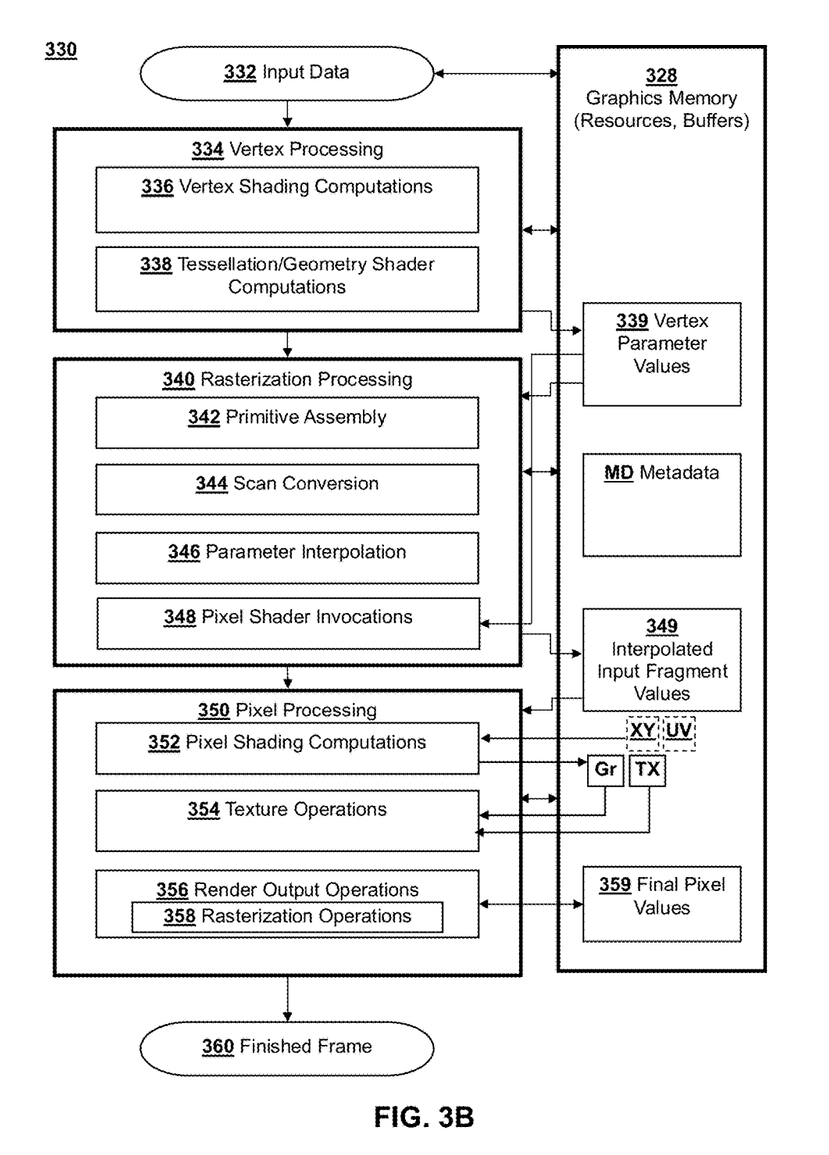
FIG. 3B is a block diagram of a graphics processing pipeline in accordance with aspects of the present disclosure.

According to aspects of the present disclosure, the system 300 is configured to implement portions of a graphics rendering pipeline. FIG. 3B illustrates an example of a graphics rendering pipeline 330 in accordance with aspects of the present disclosure.

The rendering pipeline 330 may be configured to render graphics as images that depict a scene having a two-dimensional or preferably three-dimensional geometry in virtual space (sometime referred to herein as "world space"). The early stages of the pipeline may include operations performed in virtual space before the scene is rasterized and converted to screen space as a set of discrete picture elements suitable for output on the display device 316. Throughout the pipeline, various resources contained in the graphics memory 328 may be utilized at the pipeline stages and inputs and outputs to the stages may be temporarily stored in buffers contained in the graphics memory before the final values of the images are determined.

The rendering pipeline may operate on input data 332, which may include one or more virtual objects defined by a set of vertices that are set up in virtual space and have geometry that is defined with respect to coordinates in the scene. The early stages of the pipeline may include what is broadly categorized as a vertex processing stage 334 in FIG. 3B, and this may include various computations to process the vertices of the objects in virtual space. This may include vertex shading computations 336, which may manipulate various parameter values of the vertices in the scene, such as position values (e.g., X-Y coordinate and Z-depth values), color values, lighting values, texture coordinates, and the like. Preferably, the vertex shading computations 336 are performed by one or more programmable vertex shaders. The vertex processing stage may optionally include additional vertex processing computations, such as tessellation and geometry shader computations 338 which may be optionally used to generate new vertices and new geometries in virtual space. Once the stage referred to as vertex processing 334 is complete, at this stage in the pipeline the scene is defined by a set of vertices which each have a set of vertex parameter values 339.

The pipeline 330 may then proceed to rasterization processing stages 340 associated with converting the scene geometry into screen space and a set of discrete picture elements, i.e., pixels. The virtual space geometry may be transformed to screen space geometry through operations that may essentially compute the projection of the objects and vertices from virtual space to the viewing window (or "viewport") of the scene. The vertices may define a set of primitives.

The rasterization processing stage 340 depicted in FIG. 3B may include primitive assembly operations 342, which may set up the primitives defined by each set of vertices in the scene. Each vertex may be defined by an index, and each primitive may be defined with respect to these vertex indices, which may be stored in index buffers in the graphics memory 328. The primitives may preferably include at least triangles defined by three vertices each, but may also include point primitives line primitives, and other polygonal shapes. During the primitive assembly stage 342, certain primitives may optionally be culled. For example, those primitives whose indices indicate a certain winding order may be considered to be back-facing and may be culled from the scene.

After primitives are assembled, the rasterization processing stages may include scan conversion operations 344, which may sample the primitives at each pixel and generate fragments (sometimes referred to as pixels) from the primitives for further processing when the samples are covered by the primitive. Optionally, multiple samples for each pixel are taken within the primitives during the scan conversion operations 344, which may be used for anti-aliasing purposes. In certain implementations, different pixels may be sampled differently. For example, some edge pixels may contain a lower sampling density than center pixels to optimize certain aspects of the rendering for certain types of display device 316, such as head mounted displays (HMDs). The fragments (or "pixels") generated from the primitives during scan conversion 344 may have parameter values that may be interpolated to the locations of the pixels from the vertex parameter values 339 of the vertices of the primitive that created them. The rasterization stage 340 may include parameter interpolation operations 346 stage to compute these interpolated fragment parameter values 349, which may be used as inputs for further processing at the later stages of the pipeline.

According to aspects of the present disclosure, between primitive assembly 342 and scan conversion 344 certain operations take place that account for the fact that different subsections of the screen have different pixel resolutions. In particular implementations, once the screen location for the vertices of a primitive are known, a coarse rasterization 343 can be done to find all the predefined screen subsections (sometimes referred to herein as coarse rasterization tiles) that the primitive overlaps. For each subsection that the primitive overlaps, sub-section dependent metadata MD, e.g., an active sample count or other parameters, are received that allow the effective resolution to be modified for that subsection. Scan conversion 344 and subsequent processing stages generate the final pixel values by performing pixel processing only on the specified number of active samples for the relevant subsection or subsections.

The graphics pipeline 330 may include further pixel processing operations, indicated generally at 350 in FIG. 3B, to further manipulate the interpolated parameter values 349 and perform further operations determining how the fragments contribute to the final pixel values for display 316. Some of these pixel processing tasks may include pixel shading computations 352 that may be used to further manipulate the interpolated parameter values 349 of the fragments. The pixel shading computations may be performed by a programmable pixel shader, and pixel shader invocations 348 may be initiated based on the sampling of the primitives during the rasterization processing stages 340.

As noted above, the pixel shader invocations 348 may also be initiated based on the metadata MD specifying the active sample count for each pixel in the particular region of the display device 316 in which a primitive is to be rendered. For each pixel in the particular region, pixel shader invocations 348 occur only for a number of the color samples for the pixel equal to the active sample count.

Figure 4A:
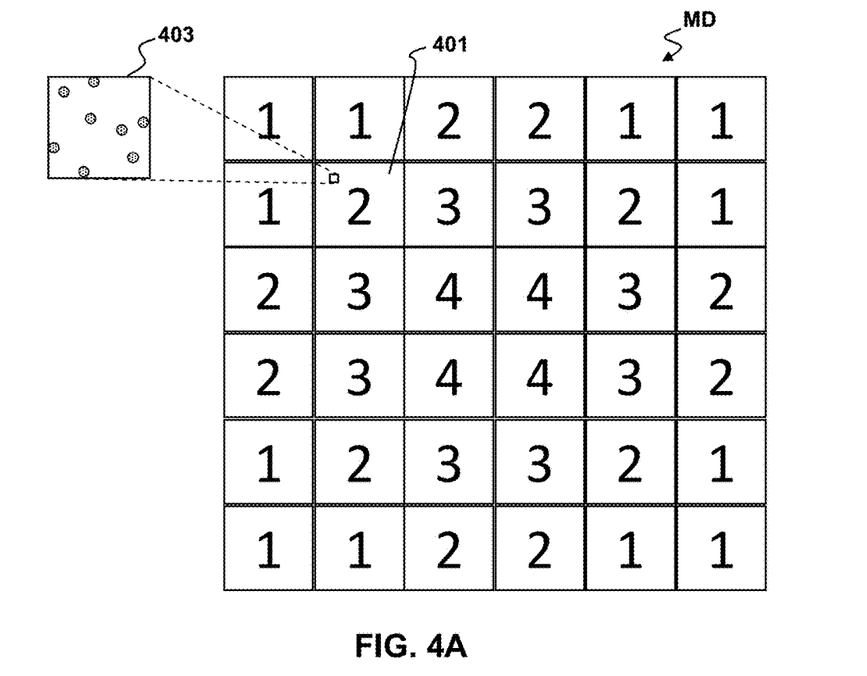
FIGS. 4A-4C schematically illustrate an example of varying effective resolution by screen location by changing active color sample count within multiple render targets in accordance with aspects of the present disclosure.

FIG. 4A illustrates an example of how the metadata MD could be configured to specify different active color samples for different regions 401 of the display screen 316. In some implementations, each region may correspond to a fixed size portion of the display. In other implementations, each region may correspond to a variable size portion of the display. In further implementations, the metadata MD can define each region 401 by ranges of pixels in the vertical and horizontal directions. In yet further implementations, the metadata MD can define each region by coarse rasterization tiles of some size, e.g. 32 pixels×32 pixels. The metadata associated with a particular region includes information specifying the active color sample count for that region. By way of example and not by way of limitation, the metadata may be stored in the form of a table in the memory 308 and/or graphics memory 328.

By way of example, and not by way of limitation, each pixel 403 of each region 401 of the display screen 316 can be defined to have 8 depth samples and 4 color samples. The metadata for any particular region can specify an active color sample count of 1, 2, 3, or 4 for that region, depending on the desired resolution for that region. In the example illustrated in FIG. 4A, central regions of the screen 316 are desired to have full resolution, so the metadata MD specifies an active sample count of 4 for those regions.

In such implementations, much of the processing in the graphics pipeline 330 occurs as normal. For example, primitive assembly 342 and other portions of rasterization processing 340, such as scan conversion 344 and parameter interpolation 346 would be implemented conventionally. The screen would have a single pixel format, e.g., specifying the color sample count, the depth sample count, the location, and other parameters. A new feature of aspects of the present disclosure is that for pixel shader invocation 348 each region 401 the metadata MD specifies the active color sample count and pixel shaders are invoked a number of times equal to the active color sample count.

In certain implementations, the pixel shader invocations 348 are unrolled as a default and depth samples are always written. If the invocations are always unrolled, the pixel shading computations 352 super-sample the pixels by virtue of being invoked for each active color sample, as opposed to multi-sampling them.

For example, if the metadata MD specifies 4 color samples per pixel for a central region $401_C$ and 2 color samples per pixel in an edge region $401_E$ it equates to 2× higher resolution in the horizontal and vertical directions in the central region $401_C$ compared to the edge region $401_E$.

Figure 4B:
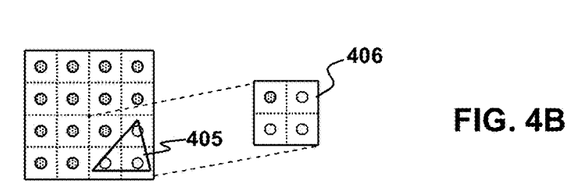

FIG. 4B illustrates an example of a single sample per pixel image in which a 2-pixel by 2-pixel quad 406 represents 4 color samples that fully describe four pixels. Depth samples are not differentiated from color samples at this point in the example. For the triangle 405, 3 of the 4 pixel-locations are covered by the triangle, so this one quad is passed to the pixel-shader PS for pixel shading computations 352 as a single fragment with 3 covered samples. The pixel shader PS shades 4 color samples and stores 3 of them in the frame-buffer FB.

Figure 4C:
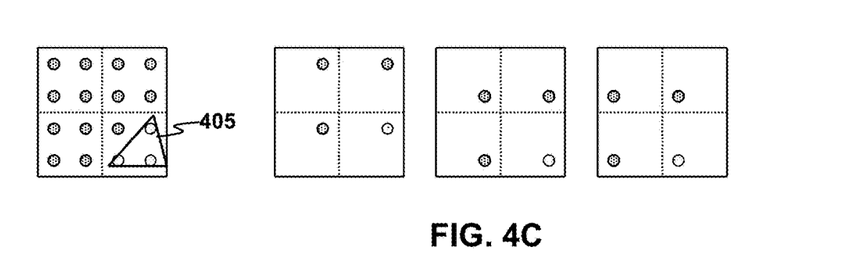

In FIG. 4C, by contrast there are four color samples per pixel, so the 16 samples shown only correspond to 2×2 pixels, while in the example in FIG. 4B it was 4×4 pixels. This diagram shows the three fragments created when the active pixels are unrolled so that pixel shader invocation occurs on each covered sample, each contains one covered sample.

The active sample count can be varied by selectively disabling samples specified by the metadata MD. For example, if the upper right and lower left samples in each pixel are rendered inactive, only the one active sample location is covered and therefore only the middle of the three fragments depicted in FIG. 4C would be passed to the pixel-shader PS.

Figure 4D:
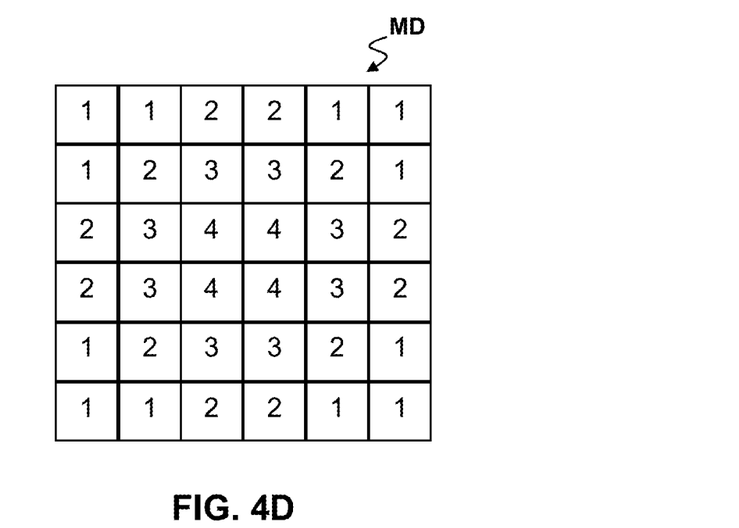
FIG. 4D is a schematic diagram illustrating an example of a metadata configuration for implementing pixel active sample count varying by screen location in accordance with aspects of the present disclosure.

In some implementations, the metadata is fixed for the optics and FOV of the display 316. An example of such a metadata configuration is shown schematically in FIG. 4D. FIG. 4D illustrates an example of how the metadata MD could be configured to specify different active pixel samples (or active color samples) for different subsections 401 of the display screen 316. In the example illustrated in FIG. 4D, central subsections of the screen 316 are desired to have full resolution, and subsections further from the center have progressively lower resolution. By way of example, and not by way of limitation, each pixel 403 of each region 401 of the display screen 316 can be defined to have a fixed number of depth and color samples, e.g., 8 depth samples and 4 color samples. The metadata for any particular region can specify an active color sample count of 1, 2, 3, or 4 for that region, depending on the desired resolution for that region.

Figure 4E:
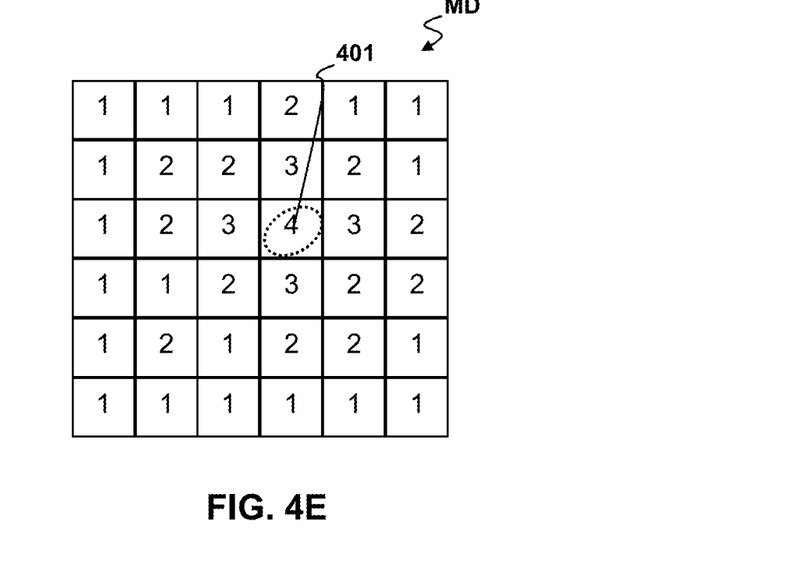
FIG. 4E is a schematic diagram illustrating an alternative example of a metadata configuration for implementing pixel active sample count varying by screen location in accordance with aspects of the present disclosure.

In alternative implementations, the metadata could vary to implement foveal rendering for eye tracking. In such implementations, the system 300 includes hardware for tracking a user's gaze, i.e., where a user's eye is pointing, and relating this information to a corresponding screen location that the user is looking at. One example of such hardware could include a digital camera in a known location with respect to the screen of the display device 316 and pointed in the general direction of a user. The digital camera could be part of the user interface 318 or a separate component. The CPU code $303_C$ could include image analysis software that analyzes images from the camera to determine (a) if the user is in the image; (b) if the user is facing the camera; (c) if the user is facing the screen; (d) if the user's eyes are visible; (e) the orientation of the pupils of the user's eyes relative to the user's head; and (f) the orientation of the user's head relative to the camera. From the known position and orientation of the camera with respect to the screen, the orientation of the pupils of the user's eyes relative to the user's head and the orientation of the user's head relative to the camera the image analysis software could determine whether the user is looking at the screen and, if so, screen space coordinates for the portion 401 of the screen the user is looking at. The CPU code $303_c$ could then pass these screen coordinates to the GPU code $303_G$, which could determine the subsection or subsections containing the portion 401. The GPU code could then modify the metadata MD accordingly so that the pixel resolution is highest in the subsection or subsections containing the portion 401 and progressively lower in subsections further away from the portion 401, as shown in FIG. 4E.

Referring again to FIG. 3B, the pixel shading computations 352 may output values to one or more buffers 305 in graphics memory 328, sometimes referred to as render targets, or if multiple, as multiple render targets (MRTs). MRTs allow pixel shaders to optionally output to more than one render target, each with the same screen dimensions but potentially with a different pixel format. Render target format limitations often mean that any one render target can only accept up to four independent output values (channels) and that the formats of those four channels are tightly tied to each other. MRTs allow a single pixel shader to output many more values in a mix of different formats. The formats of render targets are "texture-like", in that they store values per screen space pixel, but, for various performance reasons, render target formats are becoming more specialized in recent hardware generations, sometimes (but not always) requiring what is called a "resolve" to reformat the data before it is compatible with being read in by the texture units.

The pixel processing 350 may generally culminate in render output operations 356, which may include what are commonly known as raster operations (ROP). Rasterization Operations (ROP) is simply run multiple times per pixel, once for each render target among the multiple render targets (MRTs). During the output operations 356, the final pixel values 359 may be determined in a frame buffer, which may optionally include merging fragments, applying stencils, depth tests, and certain per sample processing tasks. The final pixel values 359 include the collected output to all active render targets (MRTs). The GPU 304 uses the final pixel values 359 to make up a finished frame 360, which may optionally be displayed on the pixels of the display device 316 in real-time.

The output operations 350 may also include texture mapping operations 354, which may be performed to some extent by one or more shaders (e.g., pixel shaders PS compute shaders CS, vertex shaders VS or other types of shaders) and to some extent by the texture units 306. The shader computations 352 include calculating texture coordinates UV from screen space coordinates XY, and sending the texture coordinates to the Texture Operations 354, and receiving texture data TX. The texture coordinates UV could be calculated from the screen space coordinates XY in an arbitrary fashion, but typically are calculated from interpolated input values or sometimes from the results of previous texture operations. Gradients Gr are often directly calculated from quads of texture coordinates by the texture units 306 (Texture Operations hardware units), but can optionally be calculated explicitly by the pixel shader computations 352 and passed to the texture operations 354 rather than relying on the texture units 306 to perform the default calculation.

The texture operations 356 generally include the following stages, which can be performed by some combination of a pixel shader PS and a texture unit 306. First, one or more texture coordinates UV per pixel location XY are generated and used to provide a coordinate set for each texture mapping operation. Then, gradient values Gr are calculated from the texture coordinates UV (potentially with corrections for non-orthonormality of the sample locations) and used to determine a level of detail (LOD) for a texture to apply to the primitive.

Additional Aspects

Additional aspects of the present disclosure include a graphics processing method, comprising: receiving metadata specifying an active sample configuration for a particular region of the display device among a plurality of regions of the display device; receiving pixel data for one or more pixels in the particular region, wherein the pixel data specifies the same number of color samples for each pixel; and for each pixel in the particular region, invoking a pixel shader only for color samples specified to be active samples by the active sample configuration.

An additional aspect of the present disclosure includes a graphics processing method in which different regions of a screen of a display device have different pixel resolution.

Another additional aspect is a computer-readable medium having computer executable instructions embodied therein that, when executed, implement one or both of the foregoing methods.

A further aspect is an electromagnetic or other signal carrying computer-readable instructions for performing one or both of the foregoing methods.

An additional further aspect is a computer program product downloadable from a communication network and/or stored on a computer-readable and/or microprocessor-executable medium, characterized in that it comprises program code instructions for implementing one or both of the foregoing methods.

Another additional further aspect is a graphics processing system configured to implement one or both of the foregoing methods.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for graphics processing with a graphics processing system having a graphics processing unit coupled to a display device, comprising: receiving metadata specifying an active sample configuration for a particular region of a screen of the display device among a plurality of regions of the screen; receiving pixel data for one or more pixels of an image in the particular region, wherein the pixel data specifies the same number of color samples for each pixel; and for each pixel in the particular region that is covered by a primitive, invoking a pixel shader only for color samples for the pixel specified to be active samples by the active sample configuration, wherein invoking the pixel shader includes unrolling pixel shader invocations by default, wherein pixel shading computations of the pixel shader super-sample each pixel by virtue of being invoked for each active color sample of each pixel in the particular region that is covered by the primitive, wherein the metadata specifies different active sample configurations for regions of the screen that have different resolutions.

2. The method of claim 1, wherein the metadata specifies a mask of active samples for the particular region and wherein invoking the pixel shader only for active samples includes performing a logical AND between the mask and a set of samples covered by a primitive to determine the active samples for the primitive for which the pixel shader is to be invoked.

3. The method of claim 1, wherein the metadata specifies an active sample count for the particular region of the plurality of regions; wherein the active sample count is less than or equal to the number of color samples, wherein the number of color samples is two or more;

wherein invoking the pixel shader only for active samples includes for each pixel in the particular region, invoking a pixel shader only for a number of the color samples for the pixel equal to the active sample count.

4. The method of claim 1, wherein the metadata is configured such that an active sample count for one or more regions of the plurality located near a center of the screen is greater than an active sample count for one or more regions of the plurality located near a periphery of the screen.

5. The method of claim 1, wherein the metadata is configured such that an active sample count for one or more regions of the plurality located near a center of the screen is greater than an active sample count for one or more regions of the plurality located near an edge of the screen and wherein the active count for the one or more regions located near the edge of the screen is greater than an active count for one or more regions of the plurality located near a corner of the screen.

6. The method of claim 1, wherein the display device is characterized by a field of view of 90 degrees or more.

7. The method of claim 1, wherein the display device is a head-mounted display device.

8. The method of claim 1, further comprising determining a portion of a screen of the display device that a user is looking at and wherein the metadata is configured to vary the pixel resolution such that pixel resolution is highest for one or more subsections of the screen containing the portion the user is looking at.

9. The method of claim 1, wherein the metadata is static for given optics and a given field of view of the display device.

10. The method of claim 1, wherein the metadata is configured to specify different active color samples for different regions of the screen.

11. The method of claim 1, wherein, each region of the plurality corresponds to a fixed size portion of the screen.

12. The method of claim 1, wherein each region of the plurality corresponds to a variable size portion of the screen.

13. The method of claim 1, wherein the metadata defines each region of the plurality of regions by ranges of pixels in vertical and horizontal directions.

14. The method of claim 1, wherein the metadata defines each region of the plurality by coarse rasterization tiles of some size.

15. The method of claim 1, wherein a portion of the metadata associated with a particular region of the plurality includes information specifying an active color sample count for the particular region.

16. The method of claim 1, wherein the metadata is stored in the form of a table in a memory and/or graphics memory.

17. A system for graphics processing, comprising
a graphics processing unit (GPU) configured to
receive metadata specifying an active sample configuration for a particular region of a screen of a display device among a plurality of regions of the screen;
receive pixel data for one or more pixels of an image in the particular region, wherein the pixel data specifies the same number of color samples for each pixel; and
for each pixel in the particular region that is covered by a primitive, invoke a pixel shader only for color samples for the pixel specified to be active samples by the active sample configuration, wherein invoking the pixel shader includes unrolling pixel shader invocations by default, wherein pixel shading computations of the pixel shader super-sample each pixel by virtue of being invoked for each active color sample of each pixel in the particular region that is covered by the primitive, and wherein the metadata specifies different active sample configurations for regions of the screen that have different resolutions.

18. The system of claim 17, wherein the metadata specifies a mask of active samples for the particular region and wherein the graphics processing unit is configured to invoke the pixel shader only for active samples by performing a logical AND between the mask and a set of samples covered by a primitive to determine the active samples for the primitive for which the pixel shader is to be invoked.

19. The system of claim 17, wherein the metadata specifies an active sample count for the particular region of the plurality of regions, wherein the active sample count is less than or equal to the number of color samples, wherein the number of color samples is two or more; and wherein the GPU is configured to invoke the pixel shader only for active samples includes for each pixel in the particular region by invoking a pixel shader only for a number of the color samples for the pixel equal to the active sample count.

20. The system of claim 17, wherein the metadata is configured such that an active sample count for one or more regions of the plurality located near a center of the screen is greater than an active sample count for one or more regions of the plurality located near a periphery of the screen.

21. The system of claim 17, wherein the metadata is configured such that an active sample count for one or more regions of the plurality located near a center of the screen is greater than an active sample count for one or more regions of the plurality located near an edge of the screen and wherein the active count for the one or more regions located near the edge of the screen is greater than an active count for one or more regions of the plurality located near a corner of the screen.

22. The system of claim 17, further comprising the display device, wherein the display device is characterized by a field of view of 90 degrees or more.

23. The system of claim 17, further comprising the display device, wherein the display device is a head-mounted display device.

24. The system of claim 17, wherein the system is configured to determine a portion of a screen of the display device that a user is looking at and wherein the metadata is configured to vary the pixel resolution such that pixel resolution is highest for one or more subsections of the screen containing the portion the user is looking at.

25. The system of claim 17, wherein the system is configured to use static metadata for given optics and field of view of the display device.

26. The system of claim 17, wherein the metadata is configured to specify different active color samples for different regions of the screen.

27. The system of claim 17, wherein, each region of the plurality corresponds to a fixed size portion of the screen.

28. The system of claim 17, wherein each region of the plurality corresponds to a variable size portion of the screen.

29. The system of claim 17, wherein the metadata defines each region of the plurality of regions by ranges of pixels in vertical and horizontal directions.

30. The system of claim 17, wherein the metadata defines each region of the plurality by coarse rasterization tiles of some size.

31. The system of claim 17, wherein a portion of the metadata associated with a particular region of the plurality includes information specifying an active color sample count for the particular region.

32. The system of claim 17, further comprising a memory and/or graphics memory, wherein the metadata is stored in the form of a table in the memory and/or graphics memory.

33. A non-transitory computer-readable medium having computer executable instructions embodied therein that, when executed, implement a method for graphics processing with a graphics processing system having a graphics processing unit coupled to a display device, the method comprising:

receiving metadata specifying an active sample configuration for a particular region of a screen of the display device among a plurality of regions of the screen;

receiving pixel data for one or more pixels of an image in the particular region, wherein the pixel data specifies the same number of color samples for each pixel; and for each pixel in the particular region that is covered by a primitive, invoking a pixel shader only for color samples for the pixel specified to be active samples by the active sample configuration, wherein invoking the pixel shader includes unrolling pixel shader invocations by default, wherein pixel shading computations of the pixel shader super-sample each pixel by virtue of being invoked for each active color sample of each pixel in the particular region that is covered by the primitive, and wherein the metadata specifies different active sample configurations for regions of the screen that have different resolutions.

\* \* \* \* \*